United States Patent

Armstrong

[15] 3,696,402

[45] Oct. 3, 1972

[54] DIGITAL FREQUENCY DIVIDER

[72] Inventor: Thomas R. Armstrong, Clearwater, Fla.

[73] Assignee: Honeywell Information Systems Inc., Waltham, Mass.

[22] Filed: Nov. 23, 1970

[21] Appl. No.: 91,627

[52] U.S. Cl.......................340/347 DD, 179/15.55 R

[51] Int. Cl.................................................H04l 3/00

[58] Field of Search....328/39; 325/38 R; 179/15 FD, 179/15.55 R, 15 BW, 15 BC; 340/347 DD

[56] References Cited

UNITED STATES PATENTS

| | | | |
|---|---|---|---|
| 3,573,766 | 4/1971 | Perkins | 340/347 DD |
| 3,051,938 | 8/1962 | Levy | 340/347 DD |
| 3,135,947 | 6/1964 | Grondin | 340/347 DD |

*Primary Examiner*—Daryl W. Cook
*Assistant Examiner*—Jeremiah Glassman
*Attorney*—Ronald T. Reiling and Fred Jacob

[57] ABSTRACT

Digital pulse rates are divided by storing sequential bit groups, each of which has a number of bits equal to the factor by which the rate is to be divided, and generating an output pulse for each group. Each output pulse is equal to the majority binary value in that group. Where each group has an even number of bits, a toggle is used to establish the output value for groups where no majority value exists.

7 Claims, 4 Drawing Figures

INVENTOR.
THOMAS R. ARMSTRONG
BY Nicholas [signature]
ATTORNEY

INVENTOR.
THOMAS R. ARMSTRONG
BY
Nicholas P. [signature]
ATTORNEY

INVENTOR.
THOMAS R. ARMSTRONG
BY
Nicholas [signature]
ATTORNEY

DIGITAL FREQUENCY DIVIDER

BACKGROUND OF THE INVENTION

This invention relates to systems for transmission of information and particularly to frequency compressors for compressing digital information to digital information having lower data or bit rates.

The need for such compressors may occur for example when the channel through which information is to be transmitted is incapable of propagating signals having the frequency of the information. This may occur with analog signals as well as digital signals. In order to reproduce the analog signals with some fidelity it is necessary to digitize them at a fairly high rates. However the channels selected for transmitting this information may not be able to carry digital representations at that rate.

In the past, attempts have been made to overcome the problems of digitizing analog signals by clocking analog to digital converters at an integral fraction of the rate desired for fidelity. However this causes a reduction in the dynamic range that can be transmitted, and increases the tracking error. Other methods of transmitting the data over lower frequency channels have involved sampling the digital data rate. However this also has introduced substantial errors.

SUMMARY OF THE INVENTION

According to a feature of the invention these disadvantages of prior systems are obviated by storing groups of bits in the digitized data and transmitting the majority value represented by the bits in each group. According to another feature of the invention, where the number of bits in a group is an even number, a toggle signal is added to the count for determining the majority.

According to another feature of the invention successive bits are shifted from storage means to storage means and logic means determine the majority value within the storage means at any one time. Output means responsive to signals having a rate equal to the desired fraction of the rate to be transmitted through the channel, select predetermined ones of the outputs of said logic means and maintain them for a predetermined period while transmitting them to the channel.

These and other features of the invention are pointed out in the claims. Many object and advantages of the invention will become obvious from the following detailed description when read in light of the accompanying drawings.

DETAILED DESCRIPTION OF PREFERRED EMBODIMENTS

Figure 1:
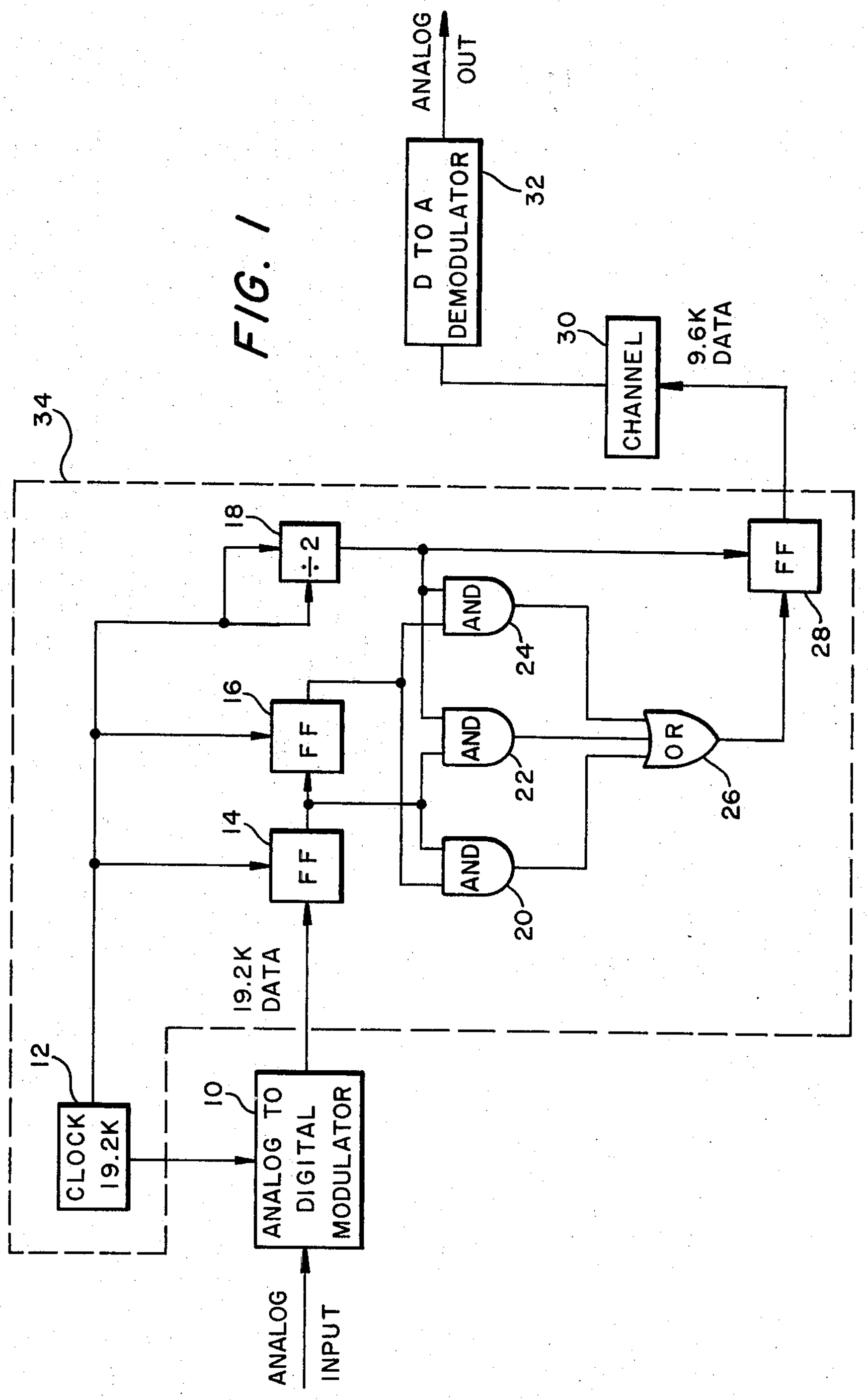
FIG. 1 is a block diagram of a transmission system embodying features of the invention.

In FIG. 1 an analog-to-digital modulator 10 responds to a clock 12 having a pulse output rate of 19.2 kilobaud, to produce digital signals having a 19.2 kilobaud rate. A first flip-flop 14 stores each bit from the modulator 10 each time a clock pulse appears from the clock 12. Each binary ONE data signal from the modulator 10 causes the flip-flop to flip upon occurrence of a clock pulse from the clock 12. The data signal is thus stored in flip-flop 14. A flip-flop 16 responds to the condition of the flip-flop 14 upon occurrence of the next clock pulse to store the content of the flip-flop 14 therein. The propagation time within the flip-flop 14 is such that whenever the flip-flop 14 assumes any particular state it is not until the next clock pulse from the clock 12 that the flip-flop 16 responds to the state of the flip-flop 14. The flip-flops 14 and 16 represent a shift register having two positions.

A divide-by-two circuit 18 which may also be in the form a flip-flop connected to flip over with every incoming pulse, produces a series of alternate ONES and ZEROS. The flip-flops 14 and 16 flip over during a clock pulse but to the state of the signal occuring at their inputs. As shown herein the signal input to each flip-flop is shown as being at the left of the block representing each flip-flop. Enabling terminals of the flip-flop that receive the clock pulses appear at the top.

An AND circuit 20 combines the output from the flip-flop 14 with that of the flip-flop 16. An AND circuit 22 receives inputs from the flip-flop 14 as well as the divide-by-two circuit 18. An AND circuit 24 receives an input from the flip-flop 16 and the divide-by-two circuit 18. Each AND circuit produces an output only when both inputs are "high" or ONE. An OR circuit 26 passes a high or ONE that may appear at the output of anyone of the AND circuits 20,22 and 24, to a flip-flop 28. The AND circuits 20, 22, and 24 as well as the OR circuit 26 form a logic circuit whose Boolean equation is $$R = TB_1 + TB_2 + B_1 B_2.$$

In that equation $T$ represents the binary value at the output of the divide-by-two circuit 18, i.e. the toggle digit, while $B_1$ and $B_2$ are the successive data digits appearing in the storage flip-flops 14 and 16.

The flip-flop 28 changes its state upon the occurrence of a ONE at the output of the OR gate 26 during the occurrence of a ONE from the divide-by-two circuit 18. Thus, the flip-flop 28 produces a new output only at every other bit time and thereby reduces the bit rate by one-half. Since the starting data rate was 19.2 kilobaud the resulting data rate is 9.6 kilobaud. This rate is suitable for a channel 30 that transmits the thus compressed information to a digital-to-analog demodulator 32 to produce an analog output signal. The modulator 10 and demodulator 32 may be so-called delta-sigma modulator and demodulator. Such delta-sigma modulators and demodulators are described in the book Modulation, Noise, and Spectral Analysis by Panter, published by the McGraw-Hill Book Co.

The flip-flops 14 through 18 and 28, as well as the AND gates 20, 22, and 24, the OR gate 26 and the clock 12 form a compressor 34. The divide-by-two circuit 18 permits the flip-flop 28 to change states only once every other bit time. Thus, only one bit of output information occurs for every two input bit times. Effectively, the flip-flops 14 and 16 form a register which stores two bits. At the same time the divide-by-two circuit 18 forms a toggle that produces alternating ONES and ZEROS. The AND gates 20, 22 and 24 as well as the OR gate 26 take a majority vote of the states of the stored bits nd the output of the divide-by-two circuit and pass it through the flip-flop 28 during the second bit time and one bit time thereafter.

Figure 2:
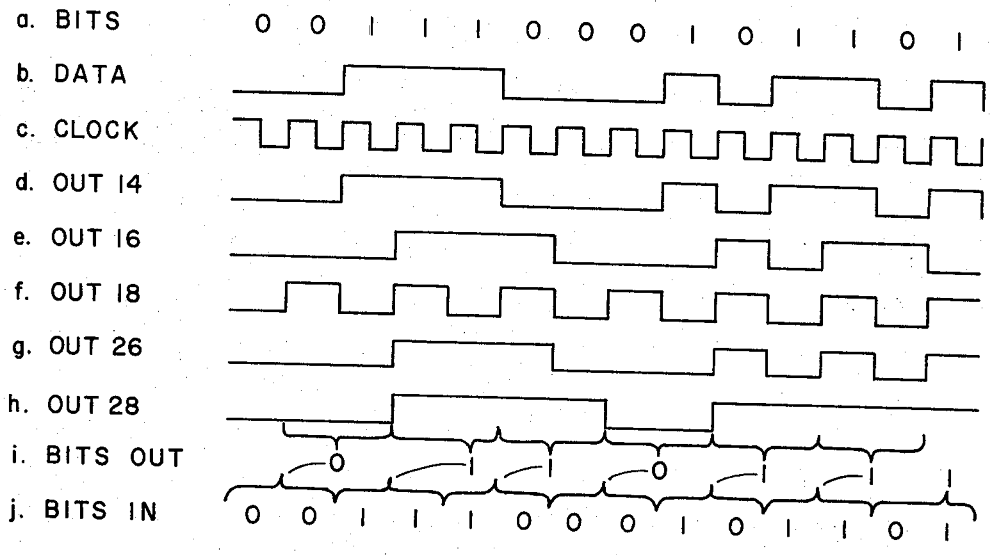
FIG. 2 is a group of voltage-time graphs and binary numerical indications, illustrating the signal levels of points in the circuit of FIG. 1.

The operation of FIG. 1 may be more fully understood from the voltage diagrams which appear in idealized form in FIG. 2. Here, line (A) represents the data passing from the analog to digital modulator 10 in the form of ZEROS and ONES. The curve (B) represents the same data in voltage diagram form. The curve (C) represents the clock signals. The curves (D), (E), (F), (G) and (H) represent the outputs of flip-flop 14, flip-flop 16, flip-flop 18, OR gate 26, and flip-flop 28. The line (I) represents the numerical representation of the output of the flip-flop 28. The line (J) is a repeat of the line (A) for the purpose of comparing it to the output. As can be seen the line (I) is composed of bits having a bit rate one-half of the lines A and J and each representing two successive bits. Where the two bits represented are each ZERO the output bit is also ZERO. Where the two input bits in a group are both ONE the output bit is also ONE. Where the two input bits group together are ZERO and ONE whether the output is ZERO or ONE is determined by the toggling effect of the divide-by-two circuit 18.

As can be seen by the curves the output of flip-flop 16 is the same as the output of flip-flop 14 except that it is shifted over by one bit time. The output of divide-by-two circuit 18 constitutes alternate zeros and ones. The output of OR gate 26 at each bit time is merely the state of the majority of the outputs of flip-flops 14 and 16 and divide-by-two circuit 18. The flip-flop 28 produces an output which starts by corresponding to the output of OR gate 26 at the onset of a two-bit period and then maintains that condition for the remainder of the two-bit period.

Because the analog-to-digital modulator 10 is clocked at a 19.2 kilobaud rate the dynamic range is increased from what would have been the case with a 9.6 kb clocking rate. The clocking rate can be increased to even higher rates to produce even greater dynamic ranges by utilizing compressors that operate with groups of three bits, four bits, five bits, etc.

Figure 3:
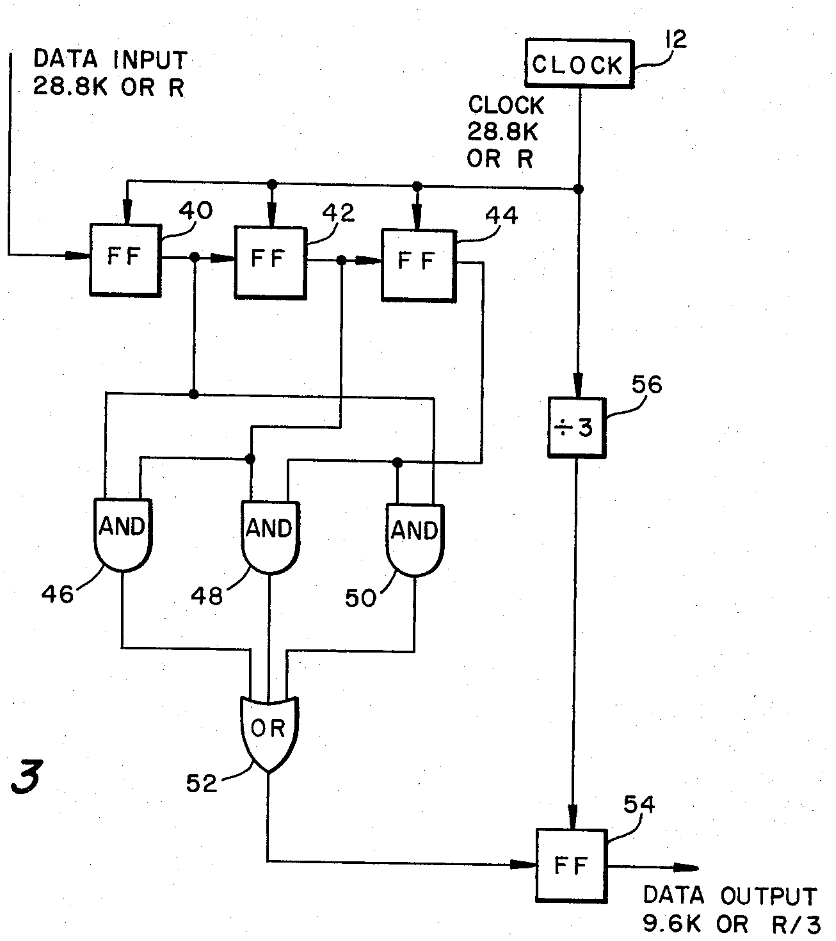
FIG. 3 is a block diagram of a compressor suitable for substitution for the compressor in FIG. 1.

An example of a compressor that operates with groups of three bits appears in FIG. 3. Here, data bits at the rate 28.8 kilobaud per second are applied to a shift register composed of flip-flops 40, 42, and 44 which shift incoming bits from one flip-flop to the other upon the occurrence of successive clock pulses from the clock 12. Three AND gates 46, 48, and 50 pass signals to an OR gate 52 whenever any one of the AND gates receives coincident signals from the outputs of two out of the three flip-flops 42,44, and 46. A flip-flop 54 passes the output of the OR gate 52 to the 9.6 kilobaud data channel each third-bit time while maintaining its output value for over the entire three-bit periods. By three-bit periods are meant three of the bit periods in the 28.8 kilobaud data input signal. The selection of each third period is determined by a divide-by-three circuit 56 that divides the 28.8 kilobaud clock signal from the clock 12 by three.

Figure 4:
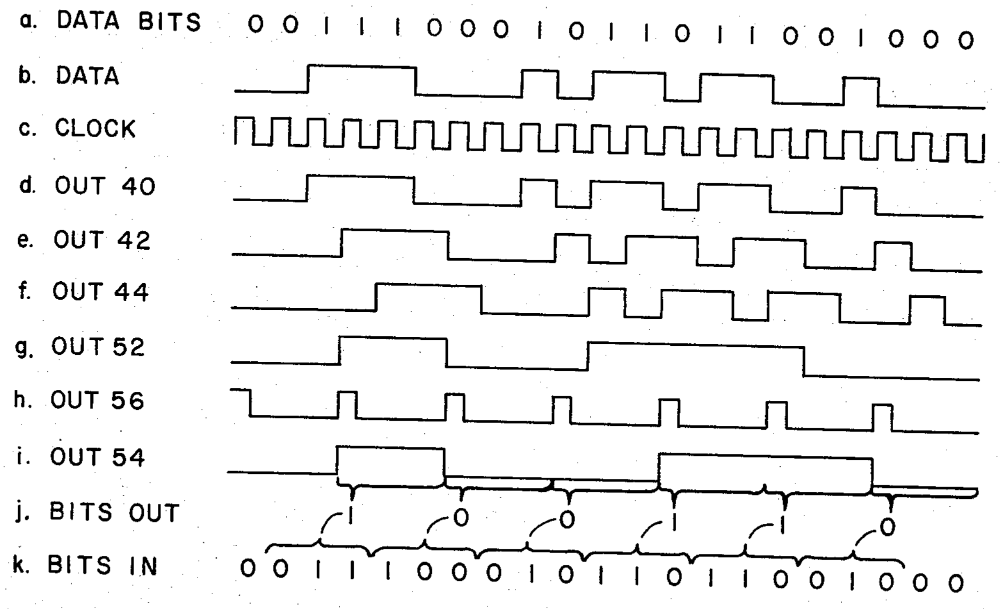
FIG. 4 is a group of voltage-time graphs and binary numerical indications, illustrating the signal levels at points in the circuit of FIG. 3.

FIG. 4 illustrates the signals appearing in FIG. 3. Line (A) is a numerical representation of the binary input data which occurs at 28.8 kilobaud. Curve (B) is an idealized representation of the voltage levels of the data with respect to time. Curve (C) illustrates the clock pulses from the clock 12. Curve (D), (E), and (F) illustrate the outputs of the flip-flops 40, 42, and 44. The output of flip-flop 40 corresponds to the data input. The output of flip-flop 42 corresponds to the data input shifted one bit. The output of flip-flop 44 corresponds to the output of the flip-flop 40 shifted by two data bits. Curve (G) illustrates the time varying voltage output of the OR gate 52. Curve (H) illustrates the output of the divide-by-three circuit 56. The latter is simply every third clock pulse appearing in the Curve C. The Curve (I) illustrates the output of the flip-flop 54. The line (J) is a numerical representation of the voltage values of the curve in Curve (H) and the line (K) is a repeat of the line A. The line (K) is included for purposes of juxtaposing the line (J) and the line (A).

The output of the OR gate 52 represents a ZERO if two out of three of the levels at the output of flip-flops 40, 42, and 44 are ZERO and represents a ONE if two out of three of the outputs of the flip-flops 40, 42 and 44 are ONE. The flip-flop 54 changes its state to the input applied by the OR gate 52 each time a pulse from the circuit 56 occurs. Thus, at the end of the third input bit the flip-flop 54 changes its state from ZERO to ONE. It retains this state until the end of the sixth input bit when, at the start of the seventh bit a pulse occurs from the circuit 56 and the state of the OR gate 52 changes to ZERO. At the end of the NINTH bit, upon the occurrence of the next timing pulse from the circuit 56, there is no change of state at the OR gate 52. Hence, there is no change of state at the output until the next timing pulse designated 58 when the output of the OR gate 52 has reached a one level. The next negative going change of level at the OR gate 52 does not change the state of the flip-flop 54 because it occurs after the next timing pulse. The flip-flop 54 does not change state until the occurrence of the timing pulse 60.

In line (J), the pulses are each at least three bit lengths long and the output data occurs at a rate of 9.6 kilobaud. Each output bit, which lasts three input bits, represents a group of three input bits. The output bit overlaps the last of the three input bits in the group. This corresponds to FIG. 2, where the output bits overlaps the last of the two input bits in the group it represents.

The compressor in FIG. 3 does not require the use of a toggle flip-flop because the input data rate is being divided by an odd number. Thus, no toggle is necessary to break a tie as a tie vote is impossible when an odd number of votes are cast. To summarize, in FIG. 1, the errors are randomized by the toggle digit, while in FIG. 3 the errors are randomized by the random nature of the digits.

An important characteristic of both compression techniques is that sequences of alternating zeros and ones (01010101...) are compressed into alternating sequences of zeros and ones at a lower data rate. Such sequences are common to the serial data stream produced when analog speech is digitized by a serial analog to digital converter such as One-Bit PCM, delta-sigma, etc. Specifically the occurrence of these alternating patterns corresponds to the occurrence of the numerous pauses in speech.

In FIG. 1, sequences 0101010101 at 19.2 kilobaud are compressed as pause sequences at 9.6 kilobaud by the toggle action. An approximate error rate based upon compression of a digitized voice data stream, may be obtained by utilizing the probabilities of four digit sequences in the data stream. Pertinent numbers are represented in the following chart. The expected number of errors, excluding pause sequences 0101 and 1010, per four digit sequence is 0.2516, and the percent bit errors is one hundred times 0.2516/4. This equals 6.4 percent. If pauses are included, the percent error is increased to 35.3 percent.

| Input $B_1$ | $B_2$ | $B_1$ | $B_2$ | Probability Of sequence | Output $R_1$ | $R_2$ | Number of Errors |
|---|---|---|---|---|---|---|---|
| 0 | 0 | 0 | 0 | 0.1094 | 0 | 0 | 0 |
| 0 | 0 | 0 | 1 | 0.0154 | 0 | 1 | 1 |
| 0 | 0 | 1 | 0 | 0.0348 | 0 | 0 | 1 |
| 0 | 0 | 1 | 1 | 0.0036 | 0 | 1 | 0 |
| 0 | 1 | 0 | 0 | 0.0353 | 1 | 0 | 1 |
| 0 | 1 | 0 | 1 | 0.2886 | 0 | 1 (pause) | — |
| 0 | 1 | 1 | 0 | 0.0157 | 1 | 0 | 2 |
| 0 | 1 | 1 | 1 | 0.0133 | 1 | 1 | 1 |
| 1 | 0 | 0 | 0 | 0.0154 | 0 | 0 | 1 |
| 1 | 0 | 0 | 1 | 0.0230 | 0 | 1 | 2 |
| 1 | 0 | 1 | 0 | 0.2891 | 1 | 0 (pause) | — |
| 1 | 0 | 1 | 1 | 0.0254 | 0 | 1 | 1 |
| 1 | 1 | 0 | 0 | 0.0031 | 1 | 0 | 0 |
| 1 | 1 | 0 | 1 | 0.0258 | 1 | 1 | 1 |
| 1 | 1 | 1 | 0 | 0.0133 | 1 | 0 | 1 |
| 1 | 1 | 1 | 1 | 0.0888 | 1 | 1 | 0 |

Given random triplets of 19.2 kilobaud delta-sigma digitized voice data the triplet probabilities are as follows:

P(000) = 0.125
P(001) = 0.038
P(010) = 0.324
P(011) = 0.029
P(100) = 0.038
P(101) = 0.314
P(110) = 0.029
P(111) = 0.102

For the above probabilities 26 percent errors are introduced by the compression. If zeros and ones had occurred randomly at equal probability, 25 percent errors would have been introduced. However, pause sequences 0101010101 are compressed as pause sequences after division by three, and as a result, excluding pauses the error rate is only 4.6 percent. If 20 percent of the 010 and 101 sequences do not occur during pauses the equivalent error rate is increased to 8.7 percent.

The techniques employed in FIG.'S 1 and 3 may be used to achieve higher compression ratios. The technique in FIG. 1 is employed for even compression ratios and involves adding additional flip-flops and AND circuits, while the technique of FIG. 3 involves adding additional flip-flops and AND circuits for odd compression ratios.

While embodiments of the invention have been described in detail it will be obvious to those skilled in the art that the invention may be embodied otherwise without departing from its spirit and scope.

I claim:

1. A digital frequency compressor for dividing the rate of data comprising, first storage means for storing the values of successive binary digits, second storage means connected to said storage means for storing the value in said first storage means upon occurrence of a successive digit, third storage means for storing a third value, logic means responsive to said first, second and third storage means for producing an output value representing a majority of the binary values in said first, second and third storage means, whereby said majority value is a true majority of the binary values in said first and second storage means when there is a predominant binary value in said first and second storage means, and whereby said majority value is a random majority of the binary values in said first, second and third storage means when there is no predominant binary value in said first and second storage means, and output means coupled to said logic means for selecting the outputs of said logic means and maintaining them for periods equal in bit intervals to the number by which the data are to be divided.

2. A digital frequency compressor for dividing the rate of data comprising, first storage means for storing the values of successive binary digits, second storage means connected to said first storage means for storing the value in said first storage means upon occurrence of a successive digit, third storage means for storing a third value, logic means responsive to said first, second and third storage means for producing an output value representing a majority of the binary values in said first, second and third storage means said logic means having the Boolean equation $R = TB_1 + TB_2 + B_1B_2$ where $B_1$ is the output of said first storage means $B_2$ is the output of said second storage means and $T$ is the output of said third storage means, and output means coupled to said logic means for selecting the outputs of said logic means and maintaining them for periods equal in bit intervals to the number by which the data are to be divided.

3. An apparatus as in claim 1, further comprising clock means synchronous with said data bits, and wherein said third storage means include frequency divider means responsive to said clock means for producing an output at a fraction of the rate of said clock means.

4. An apparatus as in claim 1, wherein said logic means produce sequential outputs representing the majority binary value in said storage means at any one time, and said output means select one of the sequential outputs of said logic means.

5. A device as in claim 4 wherein said divider means comprises a flip-flop and produces an output at half the rate of said clock means.

6. A system for transmitting analog information comprising analog-to-digital converter means for converting the analog information to digital information, a plurality of storage means coupled to said converter means for shifting the digital information to a plurality of consecutive positions, logic means coupled to said storage means for producing an output value that represents a majority of the values in said plurality of storage means, output means responsive to said logic means for establishing an output signal corresponding to the outputs of said logic means and maintaining them for equal time increments that are each a multiple of a bit in the digital information, channel means coupled to said output means for transmitting the output of said output means, and digital-to-analog converter means coupled to said channel means for demodulating the signals passing through said channel means.

7. A system as in claim 6 wherein said output means establish an output signal corresponding to selected ONES of the outputs of said logic means.

* * * * *